United States Patent [19]

Taylor

[11] 4,126,818

[45] Nov. 21, 1978

[54] HYBRID STEPPING MOTOR UNIT

[76] Inventor: William W. Taylor, 5300 Hamilton Ave., Apt. 103, Cincinnati, Ohio 45224

[21] Appl. No.: 807,034

[22] Filed: Jun. 16, 1977

Related U.S. Application Data

[63] Continuation-in-part of Ser. No. 709,217, Jul. 27, 1976, abandoned.

[51] Int. Cl.² ............................................. H02N 29/02
[52] U.S. Cl. ........................................ 318/46; 318/48; 318/488; 318/646
[58] Field of Search ............... 318/488, 489, 491, 646, 318/46, 47, 48, 49

[56] References Cited

U.S. PATENT DOCUMENTS

| 2,604,613 | 7/1952 | Klass | 318/488 X |
|---|---|---|---|
| 3,739,252 | 6/1973 | Hays et al. | 318/696 |
| 3,809,989 | 5/1974 | Hays et al. | 318/696 |
| 3,836,834 | 9/1974 | Abbatiello et al. | 318/488 |
| 3,940,677 | 2/1976 | Morino et al. | 318/46 X |

Primary Examiner—B. Dobeck
Attorney, Agent, or Firm—Wood, Herron & Evans

[57] ABSTRACT

A hybrid stepping motor unit includes a stepper-type primary motor and a secondary motor. The rotor shafts of the stepper-type primary motor and the secondary motor are connected to a common output shaft. The stepper-type primary motor is energized in response to an electrical command signal from an external source, such as a computer. When the stepper-type primary motor is energized, the stepper-type primary motor produces torque and attempts to drive the load combination of the interconnected rotor shafts, the common output shaft, and any mechanical load on the common output shaft, such as a machine tool component. This produces a reaction torque on the stepper-type primary motor. A transducer converts the reaction torque into an electrical control signal. The secondary motor is energized in response to the electrical control signal from the transducer. When the secondary motor is energized, the secondary motor produces torque which augments the torque of the stepper-type primary motor to drive the load circulation. After the rotor shaft of the stepper-type primary motor rotates a predetermined angular distance, a reaction torque on the stepper-type primary motor is no longer produced. The electrical control signal from the transducer ceases, and the secondary motor is de-energized. Consequently, application of torque to the common output shaft is discontinued. The hybrid stepping motor unit responds to successive electrical command signals in like manner to drive the common output shaft a preselected angular distance in response to each electrical command signal.

10 Claims, 5 Drawing Figures

HYBRID STEPPING MOTOR UNIT

CROSS-REFERENCE TO RELATED APPLICATION

This is a continuation-in-part of my original U.S. patent application Ser. No. 709,217, which was filed July 27, 1976, for "Hybrid Motor", now abandoned.

BACKGROUND OF THE INVENTION

This invention relates to electromechanical transducers, that is, devices which convert an electrical input into a mechanical output. More particularly, this invention relates to motors and, especially, stepping motors, which convert discrete electrical signals into mechanical torques that act on a mass, such as a shaft, or other mechanical load, to rotate the mass in a series of steplike angular displacements of essentially uniform magnitude. Specifically, this invention is directed to a hybrid stepping motor unit.

Conventional stepping motors have many uses. A stepping motor can be used, for example, to convert a series of digital pulses from a computer into steplike angular displacements of a shaft which is an element of a drive train for positioning a machine tool component. A stepping motor can also be employed to position an optical code disc in an electronic typesetting system or to position the pen of a chart recorder. Other exemplary uses are well known to those who are skilled in the art, several being described in "Sigma Stepping Motor Handbook", published in 1972 by Sigma Instruments, Inc.

Prior art stepping motors are of two basic types. One type of system is the conventional open loop stepper motor. This type of stepping motor is described, for example, in the aforementioned Sigma Instruments, Inc. publication. A second type of system is the conventional closed loop step-servo motor. An example of this type of stepping motor is the Digital Control C200 Series ID0376-SP-3M which is manufactured by Inland Motor Division of Kollmorgen Corporation.

An open loop stepper motor characteristically has a high heat loss to power ratio. The open loop stepper motor is, therefore, impractical for high horsepower applications.

Despite limitation to applications which require only fractional horsepower, however, open loop stepper motors advantageously provide a relatively stiff drive mechanism for a load. Stated differently, in low horsepower applications where open loop stepper motors are generally used, each discrete electrical command signal, under nominal load, is translated into a corresponding steplike displacement of the load. As the load on the open loop stepper motor increases, however, the displacement of the load lags the command signal by an increasing fraction of a step. At full load, the step lag is exactly onehalf step. Any load beyond full load will cause the open loop stepper motor to loose one, or more, steps. Nevertheless, the stiffness of the open loop stepper motor, measured in ounce-inches of torque per step lag, is relatively high compared to that of a closed loop step-servo motor.

The closed loop step-servo motor, on the other hand, characteristically has a lower heat loss to power ratio than the open loop stepper motor. The closed loop step-servo motor is, therefore, generally used in applications which require high horsepower.

In comparison with the open loop stepper motor, however, conventional closed loop step-servo motors provide a more compliant, or less stiff, drive mechanism for a load, since the closed loop step-servo motor itself receives no electrical drive signal until the load displacement lags the electrical command signal by a minimum of one full step. Unlike the open loop stepper motor, which carries full load with a lag of only one-half step, the closed loop step-servo motor carries only the first increment of load with a lag of one full step. Moreover, in order to provide a smooth progression of torque increments, the closed loop step-servo motor requires serveral full step lags in order to develop full torque. Consequently, the drive stiffness of the closed loop step-servo motor, measured in ounce-inches of torque per step lag, is low relative to that of the open loop stepper motor. This low drive stiffness of the closed loop step-servo motor has a highly detrimental effect on the resolutional integrity under load compared to the resolutional integrity under load of an open loop stepper motor.

In summary, open loop stepper motors have high heat loss to power ratios and are, therefore, suitable only for fractional horsepower applications. Open loop stepper motors do, however, have relatively high drive stiffness which enables them to maintain high resolutional integrity under load, which also puts a minimal demand on the source of electrical command signals, such as a computer. Closed loop step-servo motors, on the other hand, have relatively low heat loss to power ratios and are, therefore, suitable for multihorsepower applications. However, closed loop step-servo motors have low drive stiffness which does not enable them to maintain good resolutional integrity under load, which puts a high demand on the computer or other electrical command signal source.

OBJECTS OF THE INVENTION

A first object of this invention is to provide a motor which has characteristics of operation that make it superior to conventional stepping motors.

A second object of this invention is to provide a motor which provides a stiffer drive mechanism for a load and is effective in response to electrical command signals to position a load, such as a machine tool component, with a higher degree of resolutional integrity than conventional stepping motors.

Another object of this invention is to provide an open loop motor that is capable of carrying full-rated torque without danger of missing steps.

A further object of this invention is to provide an efficient motor of any desired horsepower rating from fractional to multihorsepower, for example, 10 or more horsepower.

Another object of this invention is to provide a motor which, due to improved drive stiffness, has a high natural drive frequency so as to provide superior acceleration and deceleration times.

Another object of this invention is to provide a motor the cost of which is comparable to that of conventional closed loop step-servo motors of equal horsepower rating.

SUMMARY OF THE INVENTION

The present invention provides a unique hybrid stepping motor unit which differs from stepping motors of either the conventional open loop stepper type or the closed loop step-servo type. More particularly, the hybrid stepping motor unit of the present invention includes a low horsepower stepper-type primary motor. The hybrid stepping motor unit of the present invention further includes a secondary motor of relatively high horsepower. The rotor shafts of the stepper-type primary motor and the secondary motor are connected to a load, such as a common output shaft, which may in turn drive any additional load.

The stepper-type primary motor has a drive circuit which energizes the stepper-type primary motor in response to an electrical command signal from an external source, such as a computer. When the stepper-type primary motor is energized, the stepper-type primary motor produces a torque and attempts to drive the interconnected rotor shafts and the common output shaft. This produces a mechanical reaction, or back torque, on the stepper-type primary motor. The secondary motor has a drive circuit which energizes the secondary motor in response to an electrical control signal which is produced by a suitable transducer in response to the reaction torque on the stepper-type primary motor. When the secondary motor is energized, the secondary motor produces a torque which augments the torque of the stepper-type primary motor to drive the interconnected rotor shafts and the common output shaft.

After the rotor shaft of the stepper-type primary motor rotates a predetermined angular distance, a reaction torque on the stepper-type primary motor is no longer produced, and the electrical control signal from the transducer ceases so that the secondary motor is de-energized. Consequently, application of torque to the common output shaft is discontinued. The hybrid stepping motor unit responds to successive electrical command signals in like manner to drive the common output shaft a preselected angular distance in response to each electrical command signal.

In a preferred embodiment of a hybrid stepping motor unit in accordance with the present invention, the stepper-type primary motor is mounted directly upon the secondary motor to form a highly compact unit. The rotor shaft of the stepper-type primary motor is connected through resolution gearing to the rotor shaft of the secondary motor. Preferably, the rotor shaft of the secondary motor also comprises the common output shaft.

A bracket or the like provides a deformable connecting means between the stator housing of the stepper-type primary motor and the stator housing of the secondary motor. A transducer, which may be of the strain gauge or other convenient type, is mounted on the bracket. When the stepper-type primary motor is energized, a reaction torque on the stepper-type primary motor is produced. This results in deformation of the bracket. This deformation is sensed by the transducer which produces an electrical control signal proportional to the reaction torque. This electrical control signal is fed to the drive circuit for the secondary motor. In response, the drive circuit for the secondary motor energizes the secondary motor which produces torque to augment the torque of the stepper-type primary motor to drive the common output shaft.

After the rotor shaft of the stepper-type primary motor rotates a predetermined angular distance, the stepper-type primary motor ceases to attempt to drive the common output shaft. Consequently, a reaction torque is no longer produced, and the electrical control signal from the transducer ceases. As a result, the drive circuit for the secondary motor discontinues energization of the secondary motor so that no further torque is applied to the common output shaft. The hybrid stepping motor unit responds to successive electrical command signals in like manner to drive the common output shaft a preselected angular distance in response to each electrical command signal.

One important advantage of the hybrid stepping motor unit of the present invention is that it provides a stiffer drive mechanism than conventional stepping motors. This means that the hybrid stepping motor of the present invention has a higher resolutional integrity under load than is attainable by means of prior art stepping motors, such as open loop stepper motors and closed loop step-servo motors.

A second advantage of the hybrid stepping motor unit of the present invention is that it has a higher natural drive frequency than conventional stepping motors and provides superior acceleration and deceleration times.

A further advantage of the present hybrid stepping motor unit is that the initial cost of the hybrid stepping motor unit of the present invention is comparable to the cost of conventional closed loop step-servo motors of similar horsepower rating.

These advantages of the hybrid stepping motor unit of the present invention will be discussed more fully hereinafter.

The above and other objects and advantages of the present invention will be apparent to those who are skilled in the art to which the invention pertains from the following detailed description and the drawing, in which:

GENERAL DESCRIPTION

Figure 1:
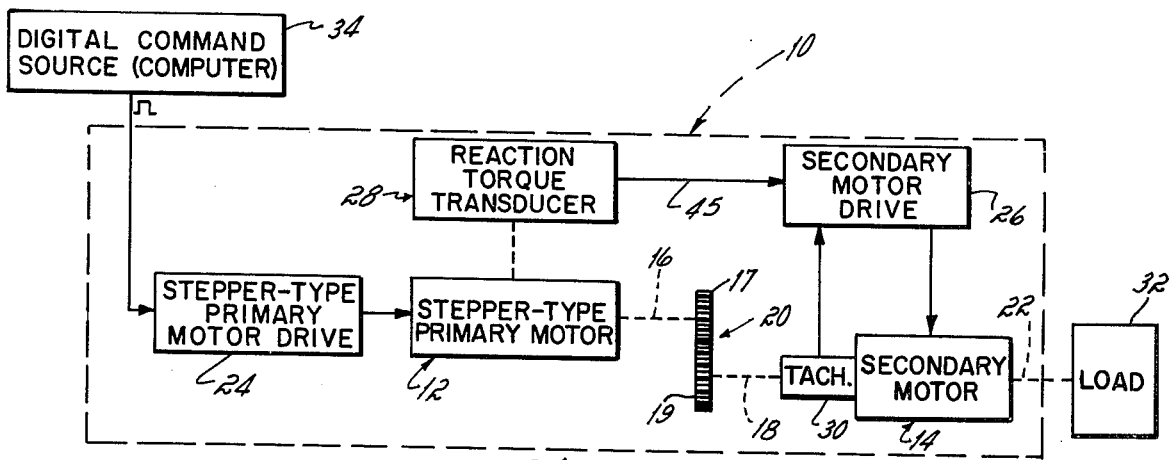
FIG. 1 is a block diagram of the hybrid stepping motor unit of the present invention.

A hybrid stepping motor unit embodying the present invention is illustrated in block diagram form in FIG. 1. The hybrid stepping motor unit, which is designated generally by the numeral 10, includes a stepper-type primary motor 12 and a secondary motor 14.

The rotor shaft 16 of the stepper-type primary motor 12 and the rotor shaft 18 of the secondary motor 14 are connected to a common output shaft 22. As shown in FIG. 1, preferably the rotor shaft 16 of the stepper-type primary motor 12 and the rotor shaft 18 of the secondary motor 14 are interconnected by resolution gearing 20, and the output shaft 22 comprises an extension of the rotor shaft 18 of the secondary motor 14.

The stepper-type primary motor 12 is energized by a stepper-type primary motor drive circuit 24. The secondary motor 14 is energized by a secondary motor drive circuit 26.

The hybrid stepping motor unit 10 also includes a reaction torque transducer 28. When the stepper-type primary motor drive circuit 24 energizes the stepper-type primary motor 12, the reaction torque transducer 28 detects a reaction torque on the stepper-type primary motor 12. The reaction torque transducer 28 produces an electrical control signal which is proportional to this reaction torque. The electrical control signal is input via a lead 45 to the secondary motor drive circuit 26 which in turn energizes the secondary motor 14. Consequently, the secondary motor 14 produces a torque to augment the torque of the stepper-type primary motor 12.

A tachometer 30 produces an electrical feedback signal as the rotor shaft 18 of the secondary motor 14 rotates. This electrical feedback signal is fed back to the secondary motor drive circuit 26 in a conventional manner for damping purposes.

With reference to FIG. 1, the hybrid stepping motor unit 10 is shown in conjunction with an exemplary application, that is, the drive for a load, such as the table of a milling machine, 32. In operation, a digital command source 34, which, for example, may comprise a programmed general purpose digital computer, supplies discrete electrical command signals to the stepper-type primary motor drive circuit 24. In response, the stepper-type primary motor drive circuit 24 energizes the stepper-type primary motor 12, which responds by applying torque to the rotor shaft 16.

The mechanical resistance to angular motion of the rotor shaft 16 and the load of the rotor shaft 18, the common output shaft 22, and the load 32 results in a reaction torque on the stepper-type primary motor 12. This reaction torque is detected by the reaction torque transducer 28 which converts the reaction torque to an electrical control signal, the magnitude of which is dependent upon the amount of reaction torque.

The electrical control signal from the transducer 28 is input via the lead 45 to the secondary motor drive circuit 26. The secondary motor drive circuit 26 in response to the electrical control signal from the reaction torque transducer 28 energizes the secondary motor 14. The secondary motor 14 responds by applying torque to the rotor shaft 18. The rotor shaft 18 is connected to the load 32 through the common output shaft 22 which may comprise an extension of the rotor shaft 18. In order to minimize energy dissipation during acceleration, however, the common output shaft 22 may be distinct from the rotor shaft 18, and gears (not shown) may be interposed between the rotor shaft 18 and the common output shaft 22.

When the rotor shaft 16 has rotated a predetermined angular distance, the stepper-type primary motor 12 no longer produces torque. The electrical control signal from the reaction torque transducer 28 ceases, and the secondary motor drive circuit 26 discontinues energization of the secondary motor 14. Consequently, the secondary motor 14 also no longer produces torque, and the hybrid stepping motor 10 regeneratively assumes its initial state to await another electrical command signal from the digital command source 34.

The hybrid stepping motor unit 10 responds to successive electrical command signals in like manner to drive the output shaft 22 a preselected angular distance in response to each such signal to drive the load 32.

DESCRIPTION OF A PREFERRED EMBODIMENT

Figures 2, 3:
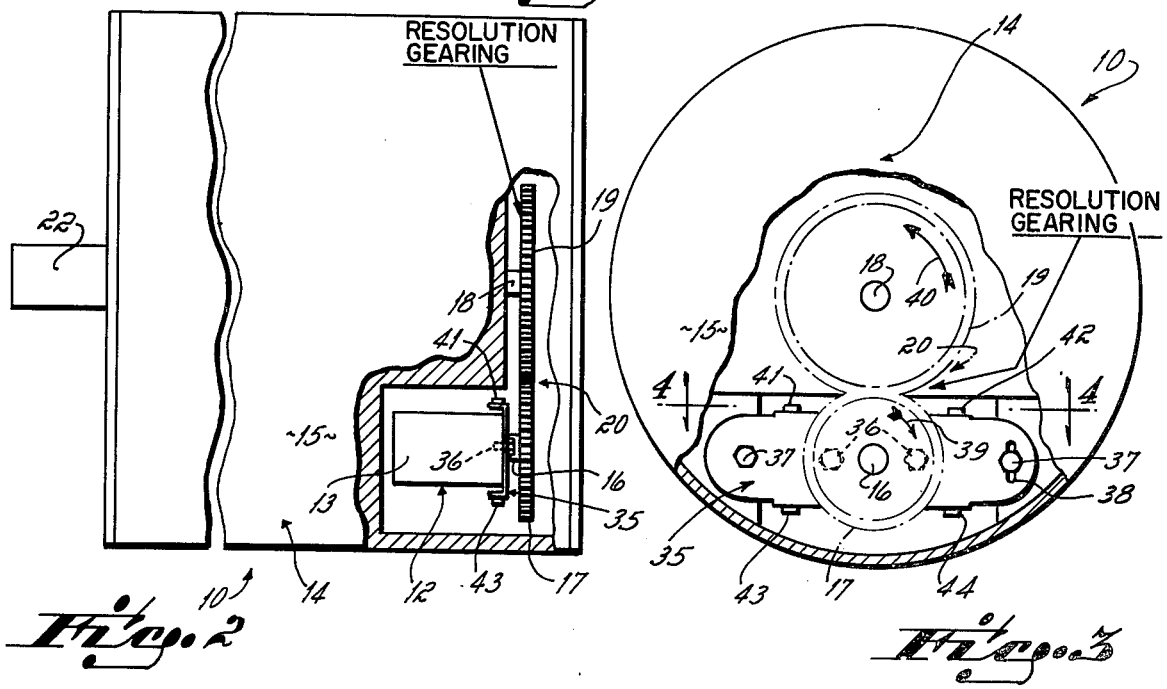
FIG. 2 is a view partly in side elevation and partly in section of a preferred embodiment of a hybrid stepping motor unit constructed in accordance with this invention.
FIG. 3 is a view partly in end elevation and partly in section of the hybrid stepping motor unit in FIG. 2.

FIGS. 2 and 3 show a preferred embodiment for the hybrid stepping motor unit 10 of the present invention. The hybrid stepping motor unit 10 includes a stepper-type primary motor 12 and a secondary motor 14. The stepper-type primary motor 12 is mounted on a bracket 35 in any appropriate manner. The bracket 35, for example, may be attached to the stator housing 13 of the stepper-type primary motor 12 by means of bolts 36. The bracket 35 is in turn mounted on the secondary motor 14. Bolts 37, for example, may secure the bracket 35 to the stator housing 15 of the secondary motor 14.

A pinion 17 is mounted on the rotor shaft 16 of the stepper-type primary motor 12. A pinion 19 is likewise mounted on the rotor shaft 18 of the secondary motor 14. The pinions 17 and 19 may be secured to the rotor shafts 16 and 18, respectively, in any suitable manner, as by press-fitting the pinions 17 and 19 on the respective rotor shafts 16 and 18.

As shown in FIGS. 2 and 3, the pinions 17 and 19 are meshed so that the rotor shafts 16 and 18 are in driving relation to one another. The bracket 35 by which the stepper-type primary motor 12 is mounted on the secondary motor 14 may have an arcuate slot 38. Consequently, when the bracket 35 is mounted on the stator housing 15 of the secondary motor 14 by means of bolts 37, the position of the pinion 17 with respect to the pinion 19 can be adjusted so that pinions 17 and 19 are in proper meshed relation to minimize gear backlash. In the preferred embodiment, the common output shaft 22 comprises an extension of the rotor shaft 18 of the secondary motor 14.

The torque of the stepper-type primary motor 12 is applied through the rotor shaft 16, the pinion 17, the pinion 19 and the rotor shaft 18 to drive the output shaft 22. Also, the secondary motor 14 applies torque through the rotor shaft 18 to drive the output shaft 22.

In accordance with the present invention, the torque which is applied to the output shaft 22 by the stepper-type pirmary motor 12 and the secondary motor 14 is additive. Stated differently, the torque of the secondary motor 14 augments the torque of the stepper-type primary motor 12. Consequently, rotation of the rotor shaft 16 of the stepper-type primary motor 12 and rotation of the rotor shaft 18 of the secondary motor 14 are in opposite directions for the configuration which is shown in FIGS. 2 and 3. That is, the stepper-type primary motor 12 rotates the pinion 17 in the clockwise direction as shown by the arrow 39 in FIG. 3, and the secondary motor 14 rotates the pinion 19 in the counterclockwise direction as shown by the arrow 40 in FIG. 3 or vice versa.

Figure 4:
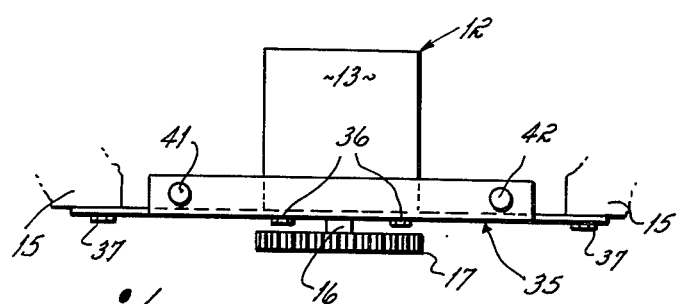
FIG. 4 is a view in top elevation on an enlarged scale taken generally along the line 4—4 in FIG. 3.

With reference to FIGS. 2-4, when the stepper-type primary motor 12 is energized and applies a torque to the rotor shaft 16, a reaction torque between the rotor and the stator of the stepper-type primary motor 12 is produced. This reaction torque is transmitted to the bracket 35.

Figure 5:
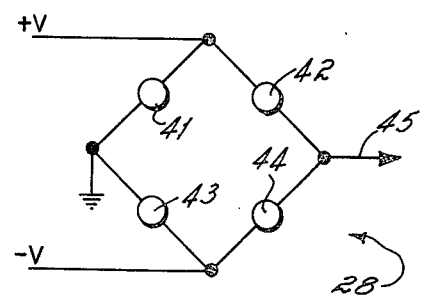
FIG. 5 is a schematic circuit diagram of a reaction torque transducer associated with the preferred embodiment of the hybrid stepping motor unit in FIGS. 2-4.

A suitable reaction torque transducer 28, such as strain gauges 41, 42, 43 and 44, is attached to the bracket 35 in any appropriate manner, as by means of a suitable adhesive. The strain gauges 41, 42, 43 and 44 are connected as shown in FIG. 5 to detect strain, or deformation, of the bracket 35 caused by the reaction torque which acts on the stepper-type primary motor 12 when the stepper-type primary motor 12 is energized by the stepper-type primary motor drive circuit 24 (FIG. 1). The output from the reaction torque transducer 28, which comprises a conventional bridge circuit that includes the strain gauges 41, 42, 43 and 44, is input via the lead 45 as an electrical control signal to the secondary motor drive circuit 26 (FIG. 1). The secondary motor drive circuit 26 energizes the secondary motor 14 whenever reaction torque is present so that the secondary motor 14 produces a torque which augments the torque that the stepper-type primary motor 12 produces to drive the common output shaft 22.

The stepper-type primary motor 12 and the stepper-type primary motor drive circuit 24 can be a small DC stepper motor plus drive circuit of well-known construction. One suitable motor is the Kearfott Division of the Singer Company Variable Reluctance Stepper Motor CR4 0192 015. One suitable drive circuit is the Kearfott Division Stepper Motor Driver C70 3531 007. The secondary motor 14 can be a conventional multihorsepower DC motor with a built-in tachometer. One suitable motor is the Inland Motor Division TTR-2952-120-A-00 rare earth magnet motor with built-in tachometer, 5:1 resolution gearing, and a resolver mount. The aforementioned resolver mount may comprise the bracket 35 to mount the stepper-type primary motor 12 on the secondary motor 14. The secondary motor drive circuit 26 can be a conventional SCR pulse-width-modulated drive circuit. One such drive circuit is the Inland Motor Division SPAE-1115 Amplifier. The secondary motor 14 and secondary motor drive circuit 26, however, may be a conventional DC motor and DC servo amplifier, especially in applications which require high stepping rates. The reaction torque transducer 28 may comprise four Bean Bae-XX-062AA-120 Strain Gauges which are attached to the resolver mount as shown in FIGS. 2–4 and connected in a bridge circuit as shown in FIG. 5.

Preferably, in the hybrid stepping motor unit of the present invention, a relatively high horsepower secondary motor augments the torque of a low horsepower stepper-type primary motor. When the hybrid stepping motor unit is configured so that the secondary motor produces substantially the entire portion of the torque necessary to drive the common output shaft, a small stepper-type primary motor can be used so that the high heat loss to power ratio of the steppe-type primary motor is insignificant. Since the secondary motor may be any horsepower rating, the hybrid stepping motor unit has application at any required horsepower. Moreover, the initial cost of the hybrid stepping motor unit is comparable to the cost of a conventional closed loop step-servo motor for any given application.

The advantages of the hybrid stepping motor unit over either the conventional open loop stepper motor or the conventional closed loop step-servo motor will now be described.

First, if the size of the desired step size is the same, the hybrid stepping motor unit provides a stiffer drive mechanism than either the conventional open loop stepper motor or the conventional closed loop step-servo motor. Consequently, the hybrid stepping motor unit has a higher resolutional integrity under load than conventional stepping motors.

In a conventional open loop stepper motor, the output shaft rest position will be such as to balance the torque on the output shaft and the reaction torque, that is, the output shaft will not be at its unloaded position but at a holding position. This means that there is a step lag between an electrical command signal and mechanical displacement of the output shaft to a predetermined desired angular position. This predetermined desired angular position has reference to the position wherein the output shaft would be in an unloaded position.

In the present hybrid stepping motor unit, the reaction torque transducer detects reaction torque on the stepper-type primary motor. If reaction torque is present, the secondary motor is energized so that the output shaft is displaced to an angular position wherein the stepper-type primary motor develops no reaction torque. Consequently, the reaction torque which would produce a holding position, if the stepper-type primary motor were operated as a conventional open loop stepper motor, in the present hybrid stepping motor unit tends to cause energization of the secondary motor to displace the rotor shaft of the stepper-type primary motor to an unloaded position. This means that there is less step lag between an electrical command signal and mechanical displacement of the output shaft to a preselected desired angular position, and therefore, the present hybrid stepping motor unit is a stiffer drive mechanism than a conventional open loop stepper motor.

The present hybrid stepping motor unit, which is stiffer than a conventional open loop stepper motor, also provides a stiffer drive mechanism than a conventional closed loop step-servo motor. With the preferred embodiment of the hybrid stepping motor of the present invention as described above, for example, the relatively high torque of the secondary motor is produced from the same output shaft displacement as required to produce the torque of the stepper-type primary motor. As indicated above, the step lag is less than that which would occur if the stepper-type primary motor were operated as a conventional open loop stepper motor. In consequence of the high combined torque and small step lag, the stiffness of the hybrid stepping motor unit of the present invention is much higher than a closed loop step-servo motor of comparable horsepower rating.

Since the hybrid stepping motor unit of the present invention has a smaller step lag than either a conventional open loop stepper motor or a conventional closed loop step-servo motor, a higher resolutional integrity under load is attainable over that heretofore known. That is, the hybrid stepping motor unit is responsive to an electrical command signal to rotate the output shaft through a steplike angular displacement such that the load is positioned with greater integrity with reference to a preselected desired angular position than is attainable with conventional stepping motors. This is a result of the fact that for a comparable step size the present hybrid stepping motor unit displaces the rotor shaft of the stepper-type primary motor to substantially the unloaded position whereas the conventional open loop stepper motor displaces the rotor shaft only to the holding position. With respect to a conventional closed loop step-servo motor, the resolutional integrity under load of the present hybrid stepping motor unit is approximated only if the size of the step for the conventional closed loop step-servo motor is a fraction of the step size for the present hybrid stepping motor unit. If a programmed general purpose digital computer were the source of electrical command signals, however, this would mean a much greater demand on the computer for the conventional closed loop step-servo motor than for the present hybrid stepping motor unit in order to obtain the same resolutional integrity under load. Consequently, the hybrid stepping motor unit of the present invention provides a stiff drive mechanism which is especially well-suited for use in high horsepower applications that require high resolutional integrity under load.

Since the natural drive frequency is related to the stiffness, given any value for the inertia of the mechanical system, the natural drive frequency of the present hybrid stepping motor unit is higher than that of a conventional open loop stepper motor or a conventional closed loop step-servo motor. This means that better acceleration and deceleration times are attainable with the hybrid stepping motor unit of the present invention.

It has been pointed out above that the hybrid stepping motor unit may be configured so that the secondary motor produces substantially the entire portion of the torque that is necessary to drive the output shaft. As a result, the efficiency of the hybrid stepping motor unit depends almost entirely on the efficiency of operation of the secondary motor, and the high heat loss to power ratio of the stepper-type primary motor is inconsequential. Since the operation of the stepper-type primary motor does not figure significantly in the determination of efficiency, there is no need to force the step lag of the stepper-type primary motor near the maximum step lag limit where maximum torque is produced and which represents the most efficient point of operation for the stepper-type primary motor. The stepper-type primary motor can operate at a small step lag to guard against loss of step. Any consequent loss of torque which results from such operation of the stepper-type primary motor may be compensated by an increase in the torque that is produced by the secondary motor by means of an increase in the gain of the secondary motor drive circuit amplifiers.

The secondary motor of the hybrid stepping motor unit may be selected so that full horsepower is required to drive the load. Consequently, since the secondary motor is fully loaded, the secondary motor will operate at optimum efficiency. The drive circuit for the secondary motor may be adjusted so that any reaction torque on the stepper-type primary motor produces energization of the secondary motor so as to produce full torque. In this case, energization of the secondary motor by the secondary motor drive circuit is such that the overload protection for the secondary motor would have to operate before steps could be missed.

Other advantages of the hybrid stepping motor unit over either a conventional open loop stepper motor or a conventional closed loop step-servo motor will be apparent to those who are skilled in the art. As one example, the hybrid stepping motor unit of the present invention does not require an up/down counter or position encoder such as a resolver, as are present in a conventional closed loop, digital-analog-digital step-servo motor. This particular advantage leads to simplification in installation procedure, based on elimination of calibration of a position encoder, as well as reduction in the number of components.

The hybrid stepping motor unit structure shown in the drawing and described above is subject to modification without departure from the spirit and scope of the appended claims.

Having described my invention, what I claim as new and desire to secure by Letters Patent is:

1. A hybrid stepping motor unit, comprising:
   a stepper-type primary motor;
   a secondary motor;
   said stepper-type primary motor and said secondary motor being connected in driving relation to a common output shaft;
   means responsive to reaction torque on said stepper-type primary motor for producing a control signal;
   said secondary motor being responsive to said control signal to augment torque produced by said stepper-type primary motor to drive said common output shaft.

2. A hybrid stepping motor unit, comprising:
   stepper-type primary motor means, responsive to a command signal, for applying torque to a common output shaft;
   reaction torque transducer means, responsive to reaction torque on said stepper-type primary motor means for producing a control signal; and
   secondary motor means responsive to said control signal, for applying torque to said common output shaft;
   whereby said secondary motor means augments torque that said stepper-type primary motor means applies to said common output shaft whenever reaction torque on said stepper-type primary motor means is present.

3. A hybrid stepping motor unit, comprising:
   a stepper-type primary motor having a rotor and stator, said rotor being connected in driving relation to an output shaft;
   a first means connected to said stepper-type primary motor and responsive to a command signal from an external source for energizing said stepper-type primary motor;
   deformable support means for said stator;
   reaction torque transducer means, responsive to deformation of said support means, for generating a control signal correlated to reaction torque on said stepper-type primary motor;
   a secondary motor connected in driving relation to said output shaft; and
   a second means connected to said secondary motor and responsive to said control signal for energizing said secondary motor.

4. The hybrid stepping motor unit of claim 3, wherein said deformable support means comprises a bracket for mounting said stepper-type primary motor on said secondary motor.

5. The hybrid stepping motor unit of claim 3, wherein said reaction torque transducer means comprises strain gauges attached to said deformable support means.

6. The hybrid stepping motor unit of claim 3, wherein said external source is a computer.

7. The hybrid stepping motor unit of claim 5, wherein said secondary motor is pulse-width-modulated motor and said second means modulates the pulse-width as a function of control signal magnitude from said strain gauges.

8. A hybrid stepping motor unit, comprising:
   a stepper-type primary motor including a stator and a rotor;
   means responsive to a command signal from an external source for energizing said stepper-type primary motor;
   a secondary motor including a stator and a rotor;
   means for connecting the rotors of said stepper-type primary motor and said secondary motor in driving relation to a common output shaft;
   structural means for mounting said stepper-type primary motor on said secondary motor;

strain gauges attached to said mounting means for producing a control signal in the presence of reaction torque between said stator and rotor of said stepper-type primary motor; and control means responsive to said control signal for energizing said secondary motor;

whereby, when said stepper-type primary motor is energized in response to a command signal and reaction torque is present, said secondary motor is energized to augment torque produced by said stepper-type primary motor to drive said common output sahft.

9. The hybrid stepping motor unit of claim 8, wherein said secondary motor is a pulse-width-modulated motor and said control means modulates the pulse-width as a function of control signal magnitude from said strain gauges.

10. A method for driving an output shaft through a steplike angular displacement, including the steps of:

generating a command signal;

using the command signal to energize a stepper-type primary motor which is connected in driving relation to an output shaft;

developing reaction torque by means of the stepper-type primary motor;

transducing the reaction torque into a control signal; and using the control signal to energize a secondary motor which is connected in driving relation to the output shaft;

thereby energizing the secondary motor when reaction torque is present to augment torque produced by the stepper-type primary motor to drive the output shaft.

* * * * *